(12) United States Patent
Xu et al.

(10) Patent No.: US 10,971,784 B2
(45) Date of Patent: Apr. 6, 2021

(54) BATTERY MODULE

(71) Applicant: CONTEMPORARY AMPEREX TECHNOLOGY CO., LIMITED, Ningde (CN)

(72) Inventors: Bohao Xu, Ningde (CN); Chuanlian Chen, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 268 days.

(21) Appl. No.: 16/039,138

(22) Filed: Jul. 18, 2018

(65) Prior Publication Data

US 2019/0027730 A1     Jan. 24, 2019

(30) Foreign Application Priority Data

Jul. 18, 2017    (CN) .......................... 201710583944.X

(51) Int. Cl.
    *H01M 2/10*        (2006.01)
    *H01M 2/20*        (2006.01)
    (Continued)

(52) U.S. Cl.
    CPC ......... *H01M 50/502* (2021.01); *H01M 50/20* (2021.01); *H01M 50/531* (2021.01); *H01M 50/561* (2021.01); *H01M 2220/20* (2013.01)

(58) Field of Classification Search
None
See application file for complete search history.

(56) References Cited

U.S. PATENT DOCUMENTS

| | | | | |
|---|---|---|---|---|
| 5,673,604 A | * | 10/1997 | Rigney | ..................... B26F 1/04 |
| | | | | 30/358 |
| 2017/0012269 A1 | * | 1/2017 | Grzywok | ............ H01M 2/1094 |

FOREIGN PATENT DOCUMENTS

| | | |
|---|---|---|
| CN | 204045642 U | 12/2014 |
| CN | 204668406 U | 9/2015 |

(Continued)

OTHER PUBLICATIONS

CN106169549A—machine translation (Year: 2016).*
Contemporary Amperex Technology Co., Limited, Extended European Search Report, EP18183618.0, dated Dec. 19, 2018, 7 pgs.

*Primary Examiner* — Haroon S. Sheikh
(74) *Attorney, Agent, or Firm* — Morgan, Lewis & Bockius LLP

(57) ABSTRACT

The present disclosure provides a battery module, which comprises: a harness isolation board provided with a mounting groove; an output pole connection sheet; and a fixing assembly. The fixing assembly comprises: a connecting member placed in the mounting groove to be fixed on the harness isolation board; and a fastening member securely connected to the connecting member and fixing the output pole connection sheet. The connecting member and the fastening member are separately formed and securely connected together, the fastening member is fixed on the harness isolation board via the connecting member, thus the fixing manner between the connecting member and the harness isolation board is not related to the fastening member, and in turn it only needs to improve the structure of the connecting member and the harness isolation board to enhance the connecting strength and the anti-torque effect between the fixing assembly and the harness isolation board.

8 Claims, 8 Drawing Sheets

(51) Int. Cl.
*H01M 2/26* (2006.01)
*H01M 2/30* (2006.01)
*H01M 50/502* (2021.01)
*H01M 50/20* (2021.01)
*H01M 50/531* (2021.01)
*H01M 50/552* (2021.01)

(56) References Cited

FOREIGN PATENT DOCUMENTS

| | | |
|---|---|---|
| CN | 204809294 U | 11/2015 |
| CN | 105304852 A | 2/2016 |
| CN | 106169549 A | 11/2016 |

\* cited by examiner

BATTERY MODULE

REFERENCE TO RELATED APPLICATIONS

The present application claims priority to Chinese Patent Application No. CN201710583944.X, filed on Jul. 18, 2017, which is incorporated herein by reference in its entirety.

FIELD OF THE PRESENT DISCLOSURE

The present disclosure relates to the field of battery technology, and particularly relates to a battery module.

BACKGROUND OF THE PRESENT DISCLOSURE

With the development of modern society, electric vehicles (especially pure electric vehicles) have been favored by more and more customers and have been used more and more widely. As the vehicle body and shape of various types of electric vehicles are continuously updated and each type of electric vehicles is pursuing the higher and higher energy density, the layout of internal space of the battery pack is becoming more and more compact, so the requirement for the space utilization of the battery module is becoming higher and higher, in particular, the higher requirement for the space utilization of the positive and negative output poles of the battery module is proposed. The connection method of the positive and negative output poles of the battery module often uses a bolt to be locked, that is, the output pole connection sheet of the battery module and a copper bar which achieve the electrical connection between the battery modules are locked by the bolt.

At present, there are mainly two methods of fixing the bolt: the bolt is fixed directly on the output pole connection sheet of the battery module by riveting, or the bolt is embedded directly in a harness isolation board of the battery module (such as the bolt and the harness isolation board can be integrally formed by insert molding). When the bolt is fixed directly on the output pole connection sheet, a locking force is directly transferred to the output pole connection sheet through the bolt in the process of locking the bolt, which easily destroys the welding strength between the output pole connection sheet and the electrode terminal of a corresponding battery; when the bolt is directly embedded in the harness isolation board, because of the bolt is generally made of metal material, the harness isolation board is made of plastic material which has low tensile strength and yield strength, the locking force is directly applied to the harness isolation board through the bolt in the process of locking the bolt, and due to the difference in the materials of the bolt and the harness isolation board, the harness isolation board is easily fractured and damaged.

SUMMARY OF THE PRESENT DISCLOSURE

In view of the problem existing in the background, an object of the present disclosure is to provide a battery module, the structure of the battery module is simple, the assembling of the battery module is convenient, which facilitates improvement of the connection strength and anti-torque strength between each fixing assembly and the whole harness isolation board.

In order to achieve the above object, the present disclosure provides a battery module, which comprises: a harness isolation board provided with a mounting groove; an output pole connection sheet provided with a through hole; and a fixing assembly provided on the harness isolation board. The fixing assembly comprises: a connecting member placed in the mounting groove and engaged with the mounting groove to be fixed on the harness isolation board; and a fastening member securely connected to the connecting member, cooperating with the through hole, and fixing the output pole connection sheet.

The present disclosure has the following beneficial effects: in the battery module according to the present disclosure, the connecting member and the fastening member of the fixing assembly are separately formed and then securely connected together, the fastening member is fixed on the harness isolation board via the connecting member, thus the fixing manner between the connecting member and the harness isolation board is not related to the fastening member, and in turn it only needs to improve the structure of the connecting member and the harness isolation board to enhance the connecting strength and the anti-torque effect between the fixing assembly and the whole harness isolation board. The structure of the battery module is simple, which makes the assembling convenient and facilitates improvement of the connection strength and the anti-torque strength between the fixing assembly and the whole harness isolation board.

Figure 1:
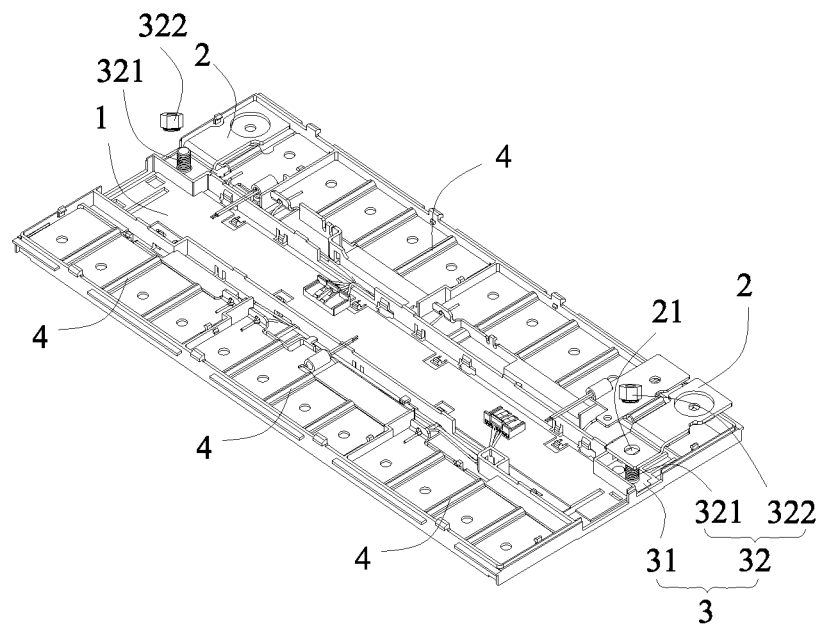
FIG. 1 is a whole perspective view of a battery module, in which batteries are not shown.
Figure 2:
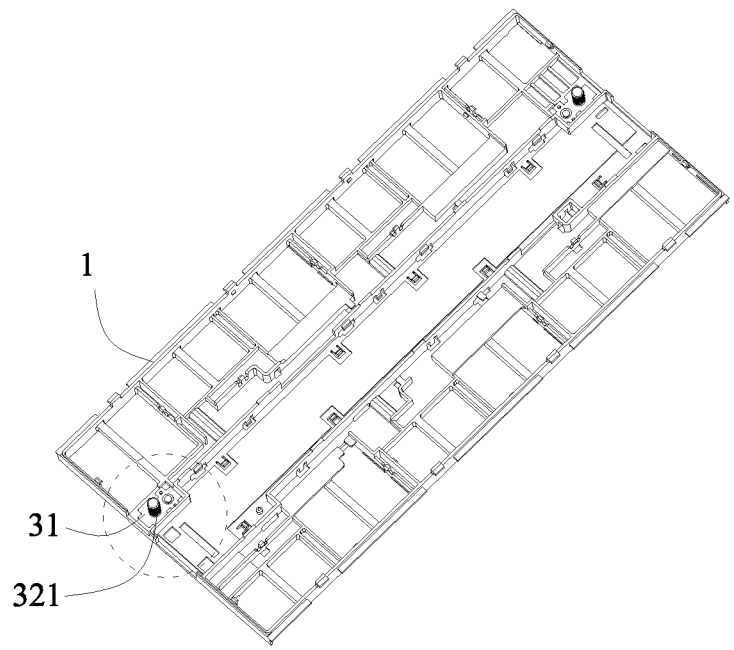
FIG. 2 is a perspective view of the battery module of FIG. 1 with busbars and an output pole connection sheet removed.
Figure 3:
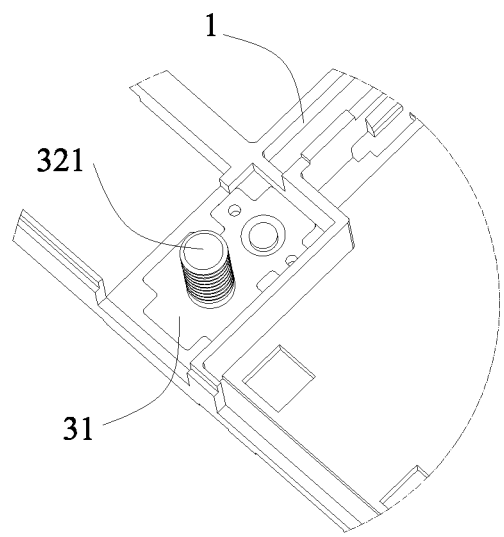
FIG. 3 is an enlarged view of a circle part of FIG. 2.

REFERENCE NUMERALS ARE REPRESENTED AS FOLLOWS 1 harness isolation board
11 mounting groove
111 first engaging portion
112 packaging protrusion
2 output pole connection sheet
21 through hole
3 fixing assembly
31 connecting member
311 second engaging portion
312 packaging hole
313 chamfer
314 riveting hole
315 boss
316 process positioning hole
32 fastening member
321 bolt
322 nut
4 busbar

DETAILED DESCRIPTION

Hereinafter a battery module according to the present disclosure will be described in detail in combination with the figures.

Referring to FIG. 1 to FIG. 16, a battery module according to the present disclosure comprises: a harness isolation board 1 provided with a mounting groove 11; an output pole connection sheet 2 provided with a through hole 21; and a fixing assembly 3 provided on the harness isolation board 1. The fixing assembly 3 comprises: a connecting member 31 placed in the mounting groove 11 and engaged with the mounting groove 11 to be fixed on the harness isolation board 1; and a fastening member 32 securely connected to the connecting member 31, cooperating with the through hole 21, and fixing the output pole connection sheet 2.

In the battery module according to the present disclosure, the connecting member 31 and the fastening member 32 of the fixing assembly 3 are separately formed and then securely connected together, the fastening member 32 is fixed on the harness isolation board 1 via the connecting member 31, thus the fixing manner between the connecting member 31 and the harness isolation board 1 is not related to the fastening member 32, and in turn it only needs to improve the structure of the connecting member 31 and the harness isolation board 1 to enhance the connecting strength and the anti-torque effect between the fixing assembly 3 and the whole harness isolation board 1. The structure of the battery module is simple, which makes the assembling convenient and facilitates improvement of the connection strength and the anti-torque strength between the fixing assembly 3 and the whole harness isolation board 1.

In the battery module according to the present disclosure, referring to FIG. 1, the battery module further comprises: a plurality of batteries (not shown), each battery has two electrode terminals opposite in polarity; and a plurality of busbars 4 electrically connected with the electrode terminals of the batteries to make all the batteries connected in series and/or in parallel. Compared with the technology described in the background (the fastening member 32 is directly fixed on the output pole connection sheet 2, or the fastening member 32 is directly embedded in the harness isolation board 1), the output pole connection sheet 2 and the fastening member 32 of the battery module according to the present disclosure are independent from each other to be provided, and the fastening member 32 is fixed on the harness isolation board 1 via the connecting member 31. In the process of locking the output pole connection sheet 2 via the fastening member 32, the locking force cannot be transferred to the output pole connection sheet 2 via the fastening member 32, and the locking force does not directly apply to the harness isolation board 1, therefore the strength of a welding seam between the output pole connection sheet 2 and the corresponding electrode terminal will not be damaged, and the problem of fracture and damage of the harness isolation board 1 will not exist.

Figure 4:
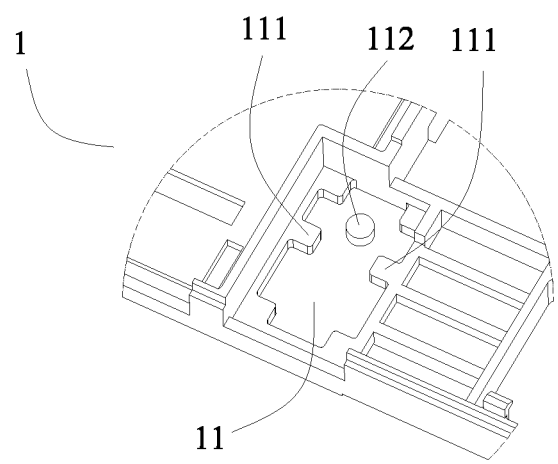
FIG. 4 is a perspective view of a mounting groove of a harness isolation board of FIG. 3.
Figure 5:
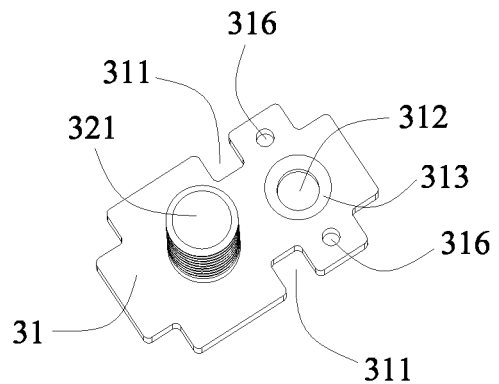
FIG. 5 is a fixing connection schematic view between a bolt and a connecting member of FIG. 3, in which a structure of the connecting member is matched with a structure of the mounting groove of FIG. 4.
Figure 8:
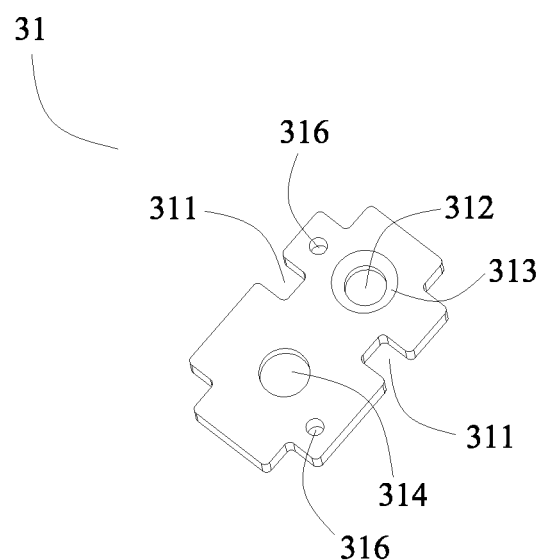
FIG. 8 is another varied example of FIG. 6.
Figure 9:
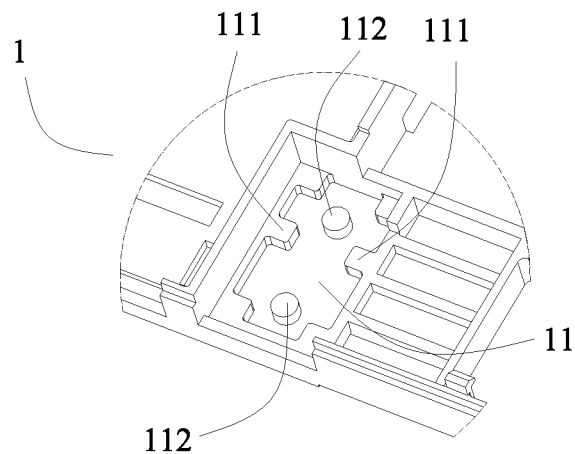
FIG. 9 is a varied example of FIG. 4.
Figure 10:
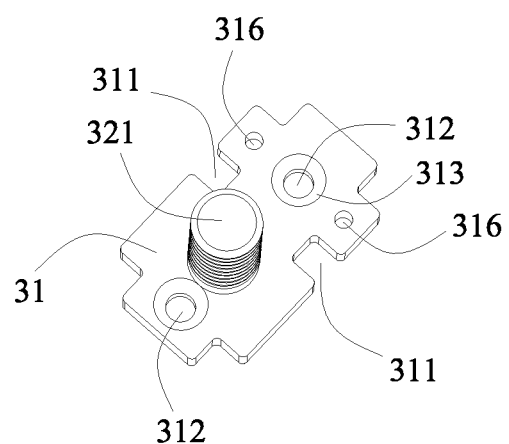
FIG. 10 is a varied example of FIG. 5, in which a structure of a connecting member is matched with a structure of a mounting groove of FIG. 9.
Figure 11:
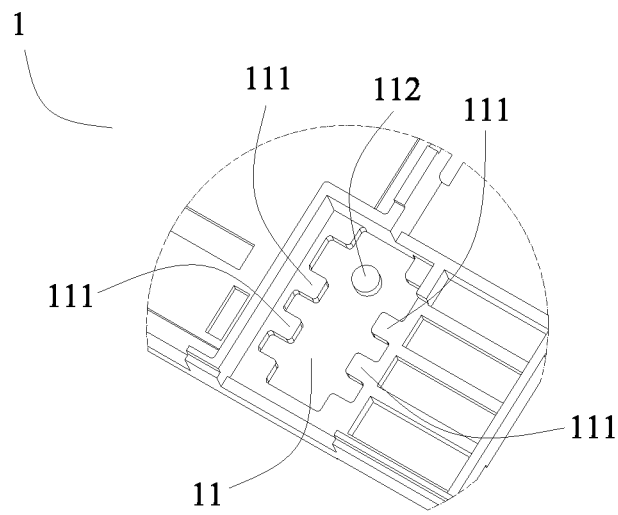
FIG. 11 is another varied example of FIG. 4.
Figure 12:
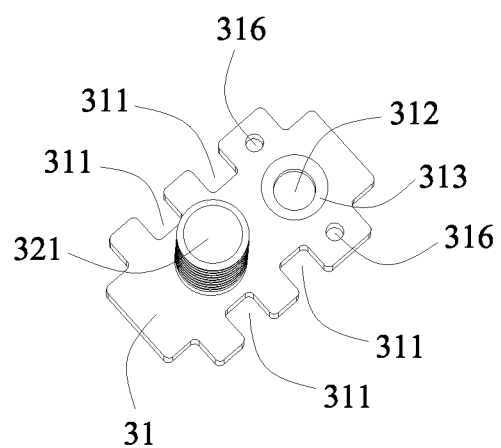
FIG. 12 is another varied example of FIG. 5, in which a structure of a connecting member is matched with a structure of a mounting groove of FIG. 11.
Figure 13:
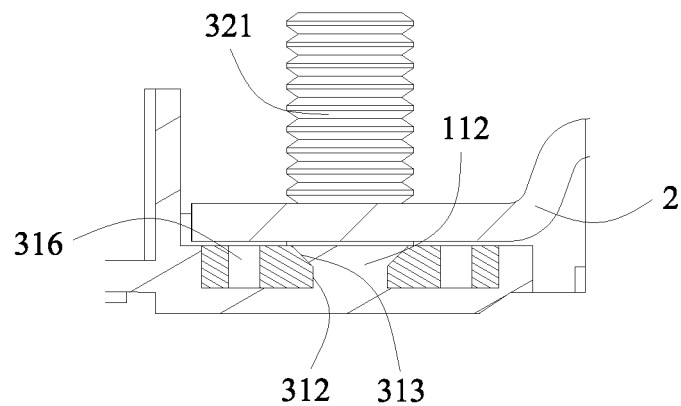
FIG. 13 is a connection relationship schematic view between a packaging protrusion of the harness isolation board and a packaging hole and a chamfer of the connecting member of the battery module according to the present disclosure.

In the battery module according to the present disclosure, referring to FIG. 4, FIG. 9 and FIG. 11, the mounting groove 11 of the harness isolation board 1 is provided with a first engaging portion 111. Referring to FIG. 5 to FIG. 8, FIG. 10 and FIG. 12, the connecting member 31 is provided with a second engaging portion 311. The first engaging portion 111 and the second engaging portion 311 are latched with each other to limit a circumferential displacement of the connecting member 31 in the mounting groove 11. Here "to limit the circumferential displacement of the connecting member 31 in the mounting groove 11" refers to that, under the engagement between the first engaging portion 111 and the second engaging portion 311, the connecting member 31 will not move in the plane where a bottom surface of the mounting groove 11 is present.

Further, the first engaging portion 111 can be a recessed groove, and the second engaging portion 311 can be a protrusion latched with the recessed groove, or the first engaging portion 111 can be a protrusion, and the second engaging portion 311 can be a recessed groove latched with the protrusion. The first engaging portion 111 of the mounting groove 11 can be provided in pairs, and the first engaging portion 111 can be provided as one pair or multiple pairs. Correspondingly, the second engaging portion 311 of the connecting member 31 also can be provided in pairs, and the second engaging portion 311 is consistent with the first engaging portion 111 in number. Here, in the battery module according to the present disclosure, a contact area between the harness isolation board 1 and the connecting member 31 can be adjusted by controlling the first engaging portion 111 and the second engaging portion 311 in size and number, and bigger the contact area between the harness isolation board 1 and the connecting member 31 is, stronger the connection strength and the anti-torque strength between the connecting member 31 and the whole harness isolation board 1 is. However, the first engaging portion 111 and the second engaging portion 311 must be changed in size and number depend on the size of the harness isolation board 1 and the size of the connecting member 31, and should meet certain requirement for processing.

In the battery module according to the present disclosure, referring to FIG. 5 to FIG. 8 and FIG. 10 and FIG. 12, the connecting member 31 has a packaging hole 312. The mounting groove 11 of the harness isolation board 1 is provided with a packaging protrusion 112, the packaging protrusion 112 and the packaging hole 312 are engaged with each other to limit an axial displacement of the connecting member 31 in the mounting groove 11. Here "to limit the axial displacement of the connecting member 31 in the mounting groove 11" refers to that, under the engagement between the packaging protrusion 112 and the packaging hole 312, the connecting member 31 will not be detached from the mounting groove 11 along a height direction of the packaging protrusion 112. The packaging hole 312 of the connecting member 31 may be provided as one or multiple in number, and the packaging protrusion 112 of the mounting groove 11 is consistent with the packaging hole 312 in number.

In an embodiment, the harness isolation board 1 and the connecting member 31 are formed by insert molding, that is, the harness isolation board 1 is formed by injection molding with the connecting member 31. In the processing of insert molding, the injection material injected onto the connecting member 31 fills the packaging hole 312 and forms the packaging protrusion 112 in the mounting groove 11, the packaging protrusion 112 and the packaging hole 312 are engaged with each other to limit the axial displacement of the connecting member 31 in the mounting groove 11, as shown in FIG. 4, FIG. 9 and FIG. 11.

In the battery module according to the present disclosure, further referring to FIG. 5 to FIG. 8, FIG. 10 and FIG. 12, the packaging hole 312 of the connecting member 31 may be provided with a chamfer 313 (formed between a location of the connection member 31 close to the packaging hole 312 and the packaging hole 312), and the packaging protrusion 112 is engaged with the packaging hole 312 and the chamfer 313 to limit the axial displacement of the connecting member 31 in the mounting groove 11. In the processing of insert molding, the injection material injected onto the connecting members 31 fills the packaging hole 312 and the chamfer 313 and forms the packaging protrusion 112, thus the packaging protrusion 112 bites into the connecting member 31 reversely at the chamfer 313 of the connecting member 31, and in turn the connecting member 31 will be not easily detached from the mounting groove 11 along the height of the packaging protrusion 112, which enhances the connection strength and anti-torque strength between the connecting member 31 and the whole harness isolation board 1.

It should be noted that, in the battery module according to the present disclosure, the contact area between the connecting member 31 and the harness isolation board 1 can be adjusted by controlling the packaging hole 312 and the packaging protrusion 112 in number and controlling the chamfer 313 in size, and in turn the upper limit of the torque and tension between the connecting member 31 and the whole harness isolation board 1 can be adjusted, thereby achieving the purpose of enhancing the connection strength and anti-torque strength between the connecting members 31 and the whole harness isolation board 1.

In the battery module according to the present disclosure, referring to FIG. 3, FIG. 5, FIG. 10 and FIG. 12, the fastening member 32 comprises a bolt 321 and a nut 322, the bolt 321 passes through the through hole 21 of the output pole connection sheet 2 and is screwed with the nut 322. Referring to FIG. 5 to FIG. 8, the connecting member 3 may be provided with a riveting hole 314, one end of the bolt 321 is placed in the riveting hole 314 and riveted to the connecting member 3 via the riveting hole 314. Here, the riveting hole 314 can be changed in shape and size depending on the actual situation so as to improve the strength and the degree of anti-torque of the bolt 321 in the direction of shear force and the direction of tension when the bolt 321 is riveted to the connecting member 3.

Figure 7:
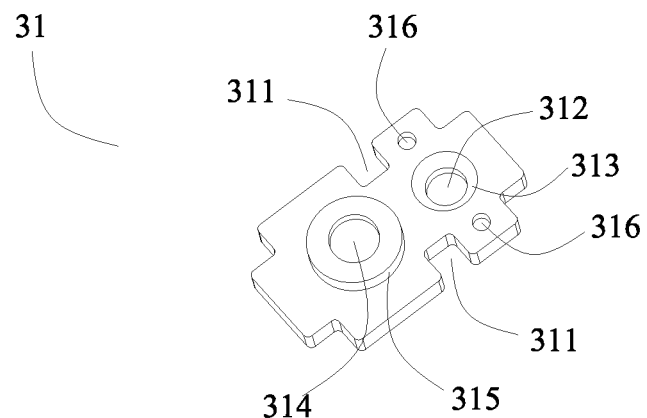
FIG. 7 is a varied example of FIG. 6.
Figure 14:
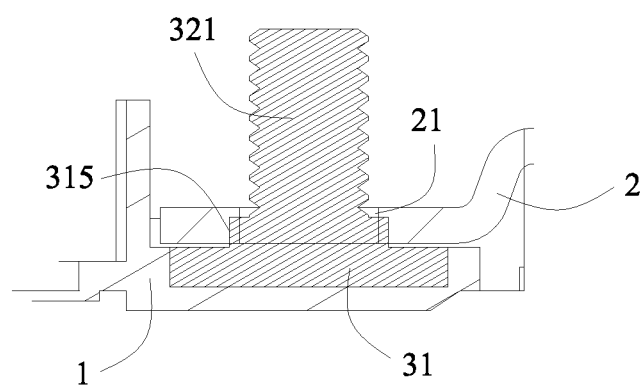
FIG. 14 is an assembling relationship schematic view between an output pole connection sheet and a connecting member having a boss in the battery module according to the present disclosure.
Figure 15:
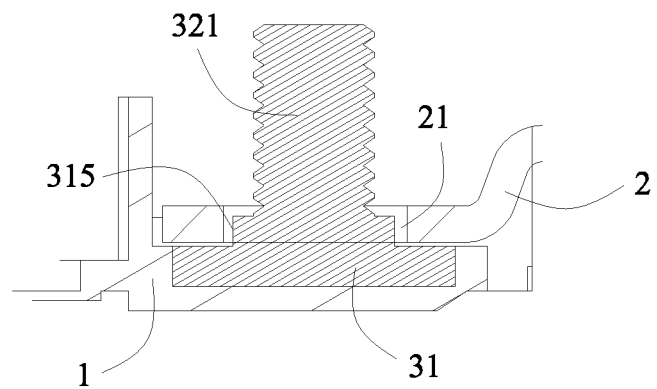
FIG. 15 is another assembling relationship schematic view between the output pole connection sheet and the connecting member having the boss in the battery module according to the present disclosure.

In the battery module according to the present disclosure, referring to FIG. 7, the connecting member 3 may further have a boss 315 (a shape can be cylindrical), and the riveting hole 314 passes though the boss 315. Referring to FIG. 14 and FIG. 15, the output pole connection sheet 2 and the bolt 321 are spaced apart from each other by the boss 315, which prevents a torque from directly applying to the output pole connection sheet 2 in the locking process of the nut 322 and the bolt 321, and in turn the connection strength of welding between the output pole connection sheet 2 and the battery will not be affected.

In an embodiment, referring to FIG. 14 and FIG. 15, the boss 315 can be inserted into the through hole 21 of the output pole connection sheet 2. Here, an interference fit, a clearance fit or a transition fit can be used to connect the through hole 21 of the output pole connection sheet 2 and the boss 315. When the through hole 21 of the output pole connection sheet 2 is in interference fit with the boss 315 and the output pole connection sheet 2 is further locked by the nut 322, which is convenient to adjust the welding parameters of the output pole connection sheet 2 and the electrode terminal of the battery and improves the stability of the electrical connection, as shown in FIG. 14. When the through hole 21 of the output pole connection sheet 2 is in clearance fit with the boss 315 and is further locked by the nut 322, which is convenient to assemble the batteries into the battery module and improves the assembling efficiency, as shown in FIG. 15.

Figure 16:
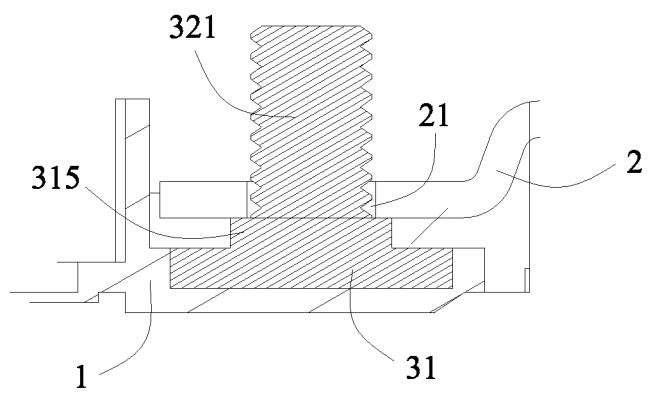
FIG. 16 is yet another assembling relationship schematic view between the output pole connection sheet and the connecting member having the boss in the battery module according to the present disclosure.

In another embodiment, referring to FIG. 16, the output pole connection sheet 2 can be positioned above the boss 315 (that is, a lower surface of the output pole connection sheet 2 attaches to an upper surface of the boss 315). This is because of some variation in manufacturing, assembling and process, the lower surface of the output pole connection sheet 2 cannot attach to the upper surface of the connecting member 31, which needs to be compensated through a height of boss 315.

Figure 6:
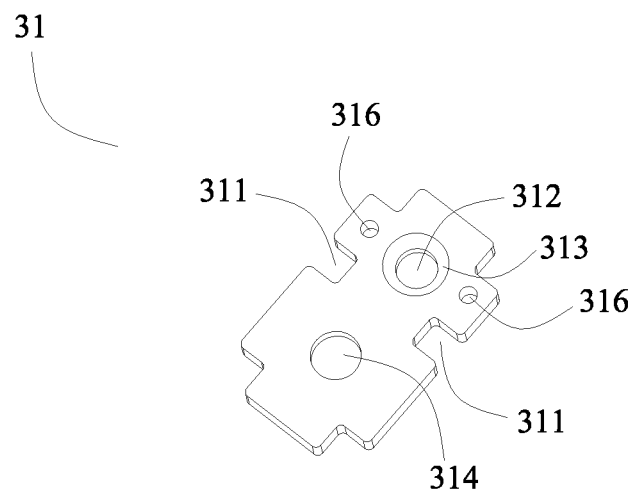
FIG. 6 is a perspective view of the connecting member of FIG. 5.

In the battery module according to the present disclosure, referring to FIG. 5 to FIG. 8, FIG. 10 and FIG. 12, each connecting member 31 may further be provided with a process positioning hole 316 for defining a relative position between the bolt 321 and the connecting member 31 when the bolt 321 and the connecting member 31 are fixed with each other and ensuring a parameter, such as strength and verticality, of the bolt 321 when the bolt 321 is fixed. In an embodiment, the process positioning hole 316 can be provided as two in number, and the two process positioning holes 316 are provided on the connecting member 31 along a width direction (as shown in FIG. 6), or the two process positioning holes 316 are respectively provided on the connecting member 31 along a diagonal direction (as shown in FIG. 8).

In the battery module according to the present disclosure, the mounting groove 11 of the harness isolation board 1 may comprise a positive output pole mounting groove and a negative output pole mounting groove respectively positioned at two ends of the harness isolation board 1. The harness isolation board 1 can be a plastic plate, and the plastic plate can be made of polypropylene (PP), polycarbonate and polyacrylonitrile (PC+ABS) or polypropylene and glass fiber (the mass content of glass fiber is 20%) (PP+20% GF), and also can be made of the reinforced PP or PC which is added with other additives. The materials of the connecting member 31 can be copper, iron, stainless steel or other alloys.

What is claimed is:
1. A battery module, comprising:
a harness isolation board provided with a mounting groove;
an output pole connection sheet provided with a through hole; and
a fixing assembly provided on the harness isolation board, wherein the fixing assembly comprises:

a connecting member placed in the mounting groove and engaged with the mounting groove to be fixed on the harness isolation board; and a fastening member securely connected to the connecting member, cooperating with the through hole, and fixing the output pole connection sheet, the fastening member comprises a bolt and a nut, the bolt passes through the through hole of the output pole connection sheet and is screwed with the nut, and the connecting member is provided with a riveting hole, one end of the bolt is placed in the riveting hole and riveted to the connecting member via the riveting hole.

2. The battery module according to claim 1, wherein the connecting member has a boss, and the riveting hole passes though the boss.

3. The battery module according to claim 2, wherein the boss is inserted into the through hole of the output pole connection sheet.

4. The battery module according to claim 2, wherein the output pole connection sheet is positioned above the boss.

5. The battery module according to claim 1, wherein the mounting groove of the harness isolation board is provided with a first engaging portion;

the connecting member is provided with a second engaging portion; and the first engaging portion and the second engaging portion are latched with each other to limit a circumferential displacement of the connecting member in the mounting groove.

6. The battery module according to claim 5, wherein the first engaging portion is a recessed groove, and the second engaging portion is a protrusion latched with the recessed groove; or the first engaging portion is a protrusion, and the second engaging portion is a recessed groove latched with the protrusion.

7. The battery module according to claim 5, wherein the connecting member has a packaging hole; and the mounting groove of the harness isolation board is provided with a packaging protrusion, the packaging protrusion and the packaging hole are engaged with each other to limit an axial displacement of the connecting member in the mounting groove.

8. The battery module according to claim 7, wherein the packaging hole of the connecting member is provided with a chamfer, and the packaging protrusion is engaged with the packaging hole and the chamfer to limit the axial displacement of the connecting member in the mounting groove.

* * * * *